United States Patent [19]

Reader et al.

[11] 4,132,500
[45] Jan. 2, 1979

[54] CONTROLLABLE AND PROGRAMMABLE FLUID FLOW MODULATION SYSTEM

[75] Inventors: Kenneth R. Reader, Monrovia; Joseph B. Wilkerson, Damascus, both of Md.

[73] Assignee: The United States of America as represented by the Secretary of the Navy, Washington, D.C.

[21] Appl. No.: 798,068

[22] Filed: May 18, 1977

[51] Int. Cl.² .............................................. B64C 21/08
[52] U.S. Cl. ................................ 416/20 R; 416/90 A
[58] Field of Search .......................... 416/20; 137/90 A

[56] References Cited

U.S. PATENT DOCUMENTS

| | | | |
|---|---|---|---|
| 3,039,537 | 6/1962 | Heidelberg | 416/20 |
| 3,211,397 | 10/1965 | Laing et al. | 416/20 |
| 3,524,711 | 8/1970 | Cheeseman et al. | 416/20 |
| 3,816,019 | 6/1974 | Norman et al. | 416/20 |
| 3,853,424 | 12/1974 | Bernaerts | 416/20 |
| 3,917,435 | 11/1975 | Wilkerson | 416/20 R |
| 3,918,833 | 11/1975 | Eilertson | 416/20 R |

FOREIGN PATENT DOCUMENTS 1057506  3/1954  France ........................................ 416/20

Primary Examiner—Everette A. Powell, Jr.
Attorney, Agent, or Firm—R. S. Sciascia; Q. E. Hodges

[57] ABSTRACT

This fluid valve is mounted in the hub of a circulation control helicopter rotor to modulate the flow of air through the hub to the blowing slots on the leading and trailing edges of the blades. The valve independently controls the air pressure to the leading edge slots and trailing edge slots so as to vary the lift produced by each rotor blade as a function of its azimuth angle. The periodic waveforms of the air pressure provided to the leading edge slots and trailing edge slots in the blades are controlled by a combination of flow regulating cams and programming rings.

25 Claims, 19 Drawing Figures

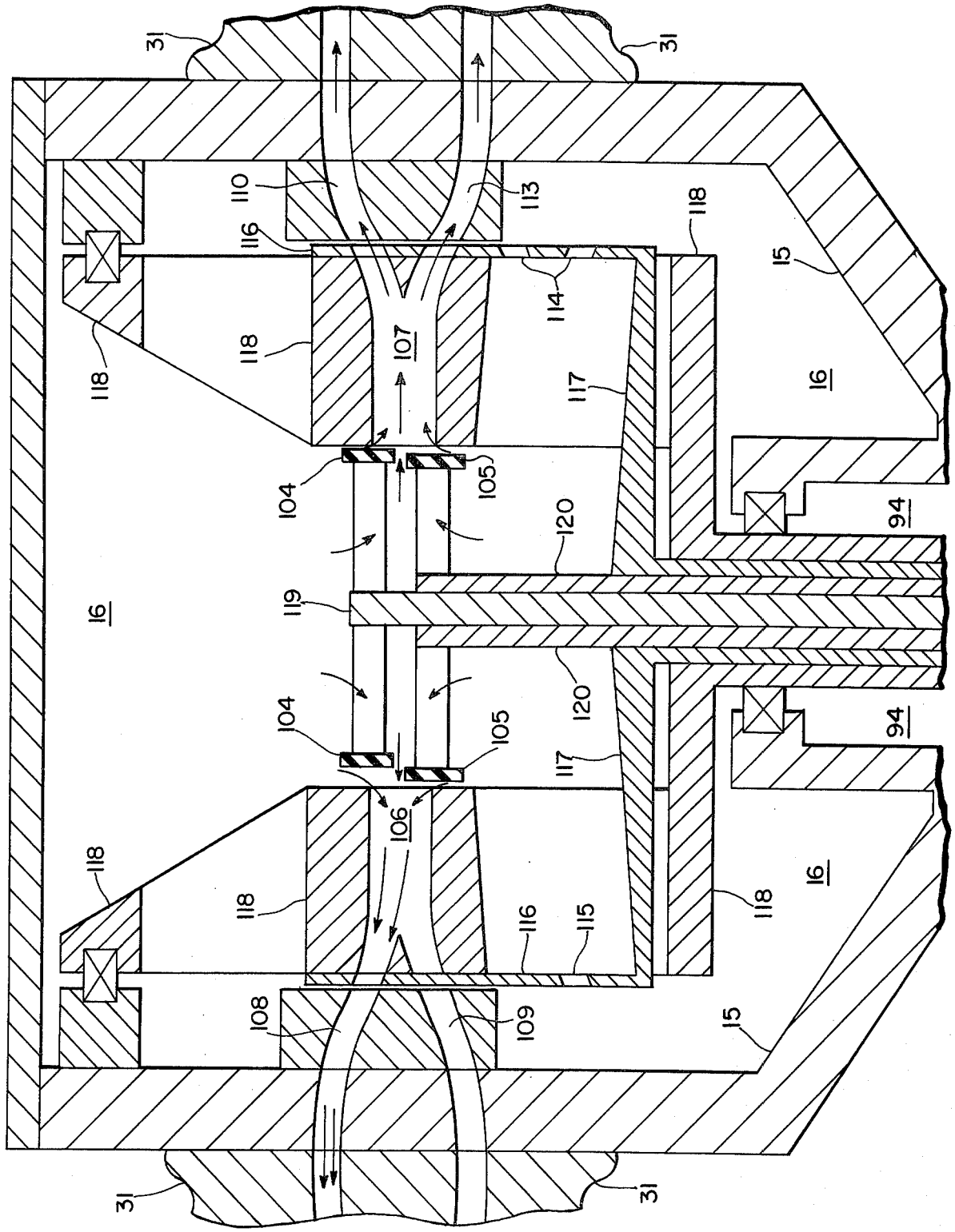

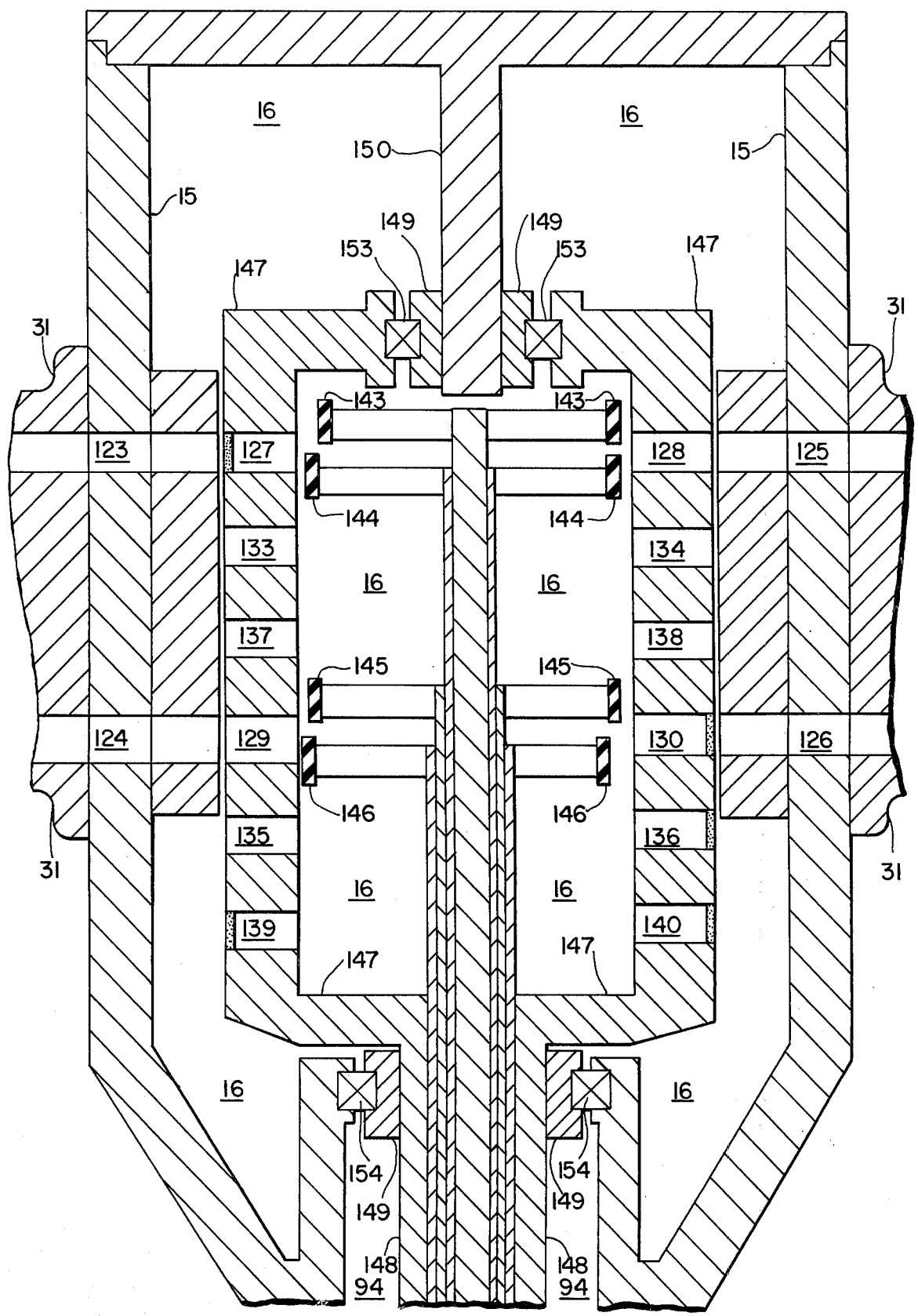

CONTROLLABLE AND PROGRAMMABLE FLUID FLOW MODULATION SYSTEM

The invention described herein may be manufactured and used by or for the Government of the United States of America for governmental purposes without the payment of any royalties thereon or therefor.

BACKGROUND OF THE INVENTION

This invention relates to pneumatic control valves and, in particular, to valves for controlling the air flow to the blades of circulation control helicopter rotors.

Conventional helicopter blades produce strong vibrations because of the widely varying amounts of lift that are produced by different parts of the blade as it rotates. The conventional ways of dealing with these vibrations have included making the helicopter rotors very flexible and varying the angle of attack of each blade to regulate the amount of lift produced by the blade. Circulation control helicopter rotors, such as those disclosed in U.S. Pat. No. 3,713,750, have rigid blades with a fixed angle of attack. The blades on a circulation control rotor (CCR) have thin slots on the edges through which a stream of pressurized air is ejected to control the lift characteristics of the blades. By carefully controlling the air pressure which is supplied to the blowing slots on the edges of the blades, the blades of a circulation control rotor can be made to produce a constant lift regardless of the angular position of the blades, the angular velocity of the blades, or the forward speed of the helicopter. To obtain this constant lift from a circulation control helicopter blade, it is necessary to regulate the air pressure being fed to the slots on the edges of the blade as a function of the azimuth angle between the direction the helicopter is flying and the long axis of the rotating blade. This air pressure will have a periodic waveform which includes a fundamental frequency the same as the rate of rotation of the helicopter rotor plus several harmonics of this fundamental frequency.

The prior art discloses several valves which may be used to generate these air pressure waveforms. One example of such a valve system is disclosed in U.S. Pat. No. 3,816,019, which uses stationary cams to restrict the flow of pressurized air from an air plenum inside the rotor hub into the rotor blades. The leading edge slots and trailing edge slots on a circulation control rotor could be provided with independent air pressure waveforms by placing two independent valve systems of this kind within the rotor hub. The air pressure waveforms produced by the prior art valves are limited to combinations of a fundamental sine wave plus a few of its harmonics. The prior art valves cannot produce air pressure waveforms with rise times and fall times which are a small percentage of the basic time period of the waveform. Neither are the prior art valves able to periodically switch the flow of pressurized air on and off during each rotation of the helicopter rotor.

Research done by the inventors has shown that the lack of these capabilities in the prior art valves for circulation control rotors will limit any helicopter which uses these prior art valves to the relatively low forward velocities at which conventional helicopters presently operate. The inventors have shown that a helicopter with a circulation control rotor having blowing slots on both the leading and trailing edges, together with an appropriate valve system, could be made to fly at forward velocities which are much higher than is possible with conventional helicopters. FIGS. 3e, 3f, and 3g illustrates the kind of air pressure waveforms which the valve system would be required to generate for such a high speed helicopter. The advance ratio of a helicopter is the forward velocity of the helicopter divided by the velocity of the tip of its rotor blades. FIG. 3e, illustrates the air pressure waveforms which would be required for the leading edge and trailing edge slots on the blades of a circulation control helicopter rotor when the advance ratio is approximately 0.5 or less. In this situation the trailing edge slots are provided with an air pressure waveform which is a simple sine wave, and the leading edge slots are provided with essentially no air pressure at all. FIG. 3f, illustrates typical air pressure waveforms which would be required for the blades of a circulation control helicopter rotor for the transition advanced ratios between 0.5 and 1.4. In this case the waveforms for both the trailing edge and leading edge slots have the same fundamental frequency plus several harmonics. However, the number of harmonics included in the leading edge waveform is much greater and the leading edge waveform has very fast rise and fall times. When the advanced ratio of the helicopter is greater than 1.4, the kind of air pressure waveforms required for the leading and trailing edges will be like those shown in FIG. 3g, have very fast rise times and fall times. A high speed helicopter with a circulation control rotor must have a valve system capable of changing its waveforms between the types shown in FIGS. 3e, 3f and 3g while the helicopter is in flight.

Most of the prior art control valves for circulation control rotors as well as the valve disclosed in this specification are intended to be mounted inside of the rotating hub of the helicopter rotor. Many of the prior art valves require several moving parts in addition to the rotating shell of the rotor hub. These reciprocating parts must repeat their motions at least once for every rotation of the rotor in order to generate the proper air pressure waveforms. Examples of such valve systems are those disclosed in U.S. Pat. Nos. 3,904,313, and 3,918,833.

OBJECTS OF THE INVENTION

It is therefore an object of this invention to provide a valve system for a circulation control helicopter rotor which is capable of switching from one output air pressure waveform to another while the rotor is in operation.

It is another object of this invention to provide an air pressure control valve by which the output air pressure waveform may have very fast rise times and fall times.

It is a further object of this invention to provide an air pressure control valve for a circulation control helicopter rotor which has a minimum number of parts moving with each rotation of the rotor.

Yet another object of this invention is to provide a control valve system for circulation control helicopter rotor which is capable of independently controlling the air pressure which is fed to the leading edge slots and trailing edge slots of the rotor blade.

A still further object of this invention is to provide a valve capable of controlling the air pressure rotor in accordance with many different and widely varying waveforms.

Another object of this invention is to provide a valve that is capable of switching the flow of pressurized air on and off and controlling the air pressure according to any one of many different and widely varying waveforms when the air pressure is switched on.

Other objects, advantages and novel features of the invention will become apparent from the following detailed description of the invention when considered along with the drawings.

SUMMARY OF THE INVENTION

This invention is a valve system for providing carefully regulated air pressure to the leading edge slots and trailing edge slots of the blades on a circulation control helicopter rotor. The air pressure provided to the leading edge slots and to the trailing edge slots of the circulation control helicopter rotor is provided by two independent valve subsystems. It is contemplated that this valve system could be built with any number of independent valve subsystems. The air pressure output of each valve subsystem will flow through holes around the circumference of the outside shell of the rotor hub. The air pressure at each hole of a give valve subsystem will have the same waveform as the air pressure at the other holes in the same channel, but this waveform will be shifted in phase from the waveforms appearing at the other holes. The hub of the helicopter rotor acts as a plenum, inside of which the air is pressurized. The flow of air from this plenum out through the holes of the hub and into the rotor blades is regulated by at least two separate and independent control surfaces in each valve subsystem. Each valve subsystem will have at least one programming nozzle ring and at least one flow regulating cam which fits within the inside cylindrical surface of the programming nozzle ring. The cams and the programming nozzle rings fit inside the plenum chamber of the helicopter rotor hub and are held stationary while the hub rotates. Each of the holes in the exterior of the hub for a given valve subsystem are aligned with and rotate about the stationary cams and programming nozzle ring for that valve subsystem. As the distance between the cams and the inside cylindrical surface of the programming nozzle ring varys with changing azimuth angles, the amount of air which is allowed to flow into the programming nozzle ring will be modulated with a waveform whose frequency spectrum comprises the basic frequency of rotation of the rotor plus one or more of its harmonics. The programming nozzle rings act like a switch turning the waveforms generated by the cams on and off as a function of the angular position of the rotating rotor hub. The on-off switching action of the programming nozzle ring can be modified by changing the position of the ring with respect to the cams and the holes in the rotor hub. The waveforms generated by the cams can be modified by moving the position of the cams with the respect to the programming nozzle ring and the holes in the rotor hub. Both the air pressure waveforms generated by the cams and the on-off switching action of the programming nozzle rings can be modified while the rotor hub is rotating and thus while the helicopter is flying. The positions of the cams and the programming nozzle ring in each valve subsystem can be adjusted independently. Once all of the cams and programming nozzle rings have been adjusted for any given set of helicopter operating conditions, the only moving part in the valve system will be the outside shell of the rotor hub.

BRIEF DESCRIPTION OF THE DRAWINGS

FIG. 11 shows a vertical cross-sectional view of the second alternative embodiment of the invention.

FIG. 12 shows a vertical cross-sectional view of the third alternative embodiment of the invention.

Whenever the same structure or device is illustrated in more than one of the figures, it is labeled with the same reference number.

DESCRIPTION OF THE PREFERRED EMBODIMENT

Figure 1:
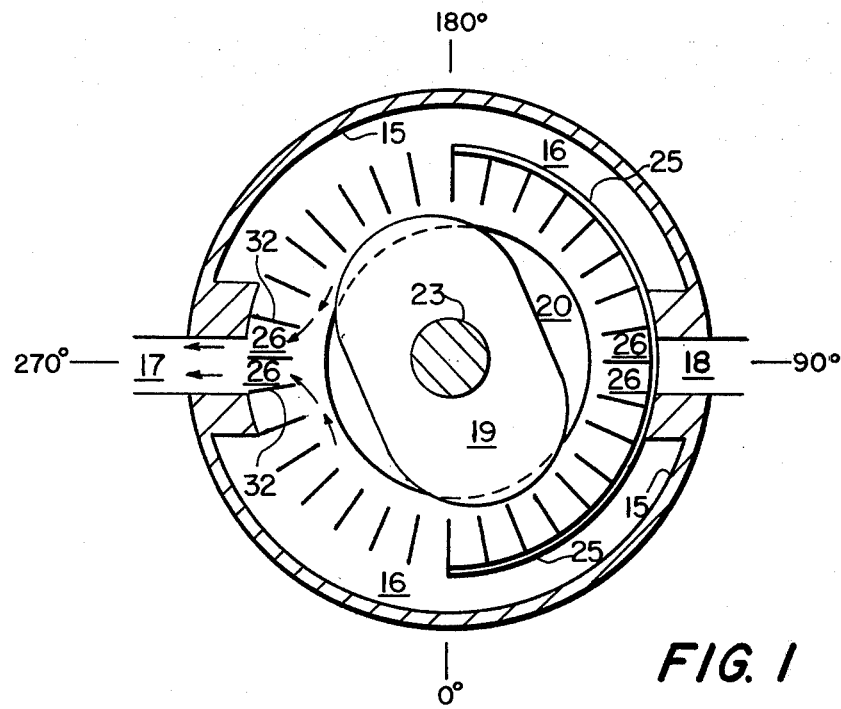
FIG. 1 is a horizontal cross-sectional view of a simplified embodiment of the invention which illustrates the principles of operation of the invention.
Figure 2:
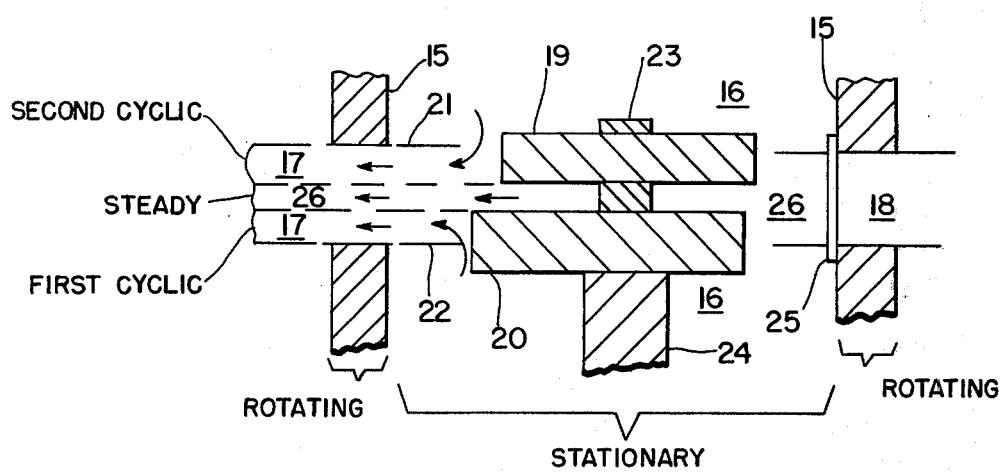
FIG. 2 is a vertical cross-sectional view of the same simplified embodiment shown in FIG. 1, which also illustrates the principles of operation of the invention.

FIGS. 1 and 2 are cross sectional views of one embodiment of the invention which has been highly simplified to facilitate explanation of the basic principles of operation. The hub 15 of the helicopter rotor acts as a plenum chamber 16 which contains pressurized air. The pressurized air reaches the plenum chamber 16 through a passageway in the main rotor shaft. This embodiment has only one valve subsystem which comprises two ports 17, 18 which lead to the slots on two separate rotor blades. The nozzle ring, the programming ring 25, and the cams 20, 19 control the flow of air to the ports 17, 18 in such a manner as to result in waveforms like those shown in FIG. 3d. The nozzle ring comprises a circular array of adjacent nozzle like radial passageways, a few of which are individually labeled 26 in FIGS. 1 and 2. As shown in FIG. 2, the outside shell of the hub rotates but the cams, programming ring and nozzle ring are stationary. Cam 19 can be rotated, raised or lowered by means of shaft 23. Cam 20 can be rotated, raised or lowered by means of the shaft 24 which is concentric with shaft 23. At any given time only four of these passages 26 in the nozzle ring will be adjacent to one of the two ports 17, 18. As the hub 15 rotates about the stationary nozzle passages and cams, each of the ports 17, 18 will pass by each of the nozzle passages once during each rotation. All of the edges of the inward facing openings of the nozzle passages in the nozzle ring form a cylindrical surface which is concentric with the shafts 23 and 24 and with the interior cylindrical surface of the hub 15. The direction of air flow through the plenum chamber 16 and out the port 17 is indicated by arrows in FIGS. 1 and 2.

FIGS. 3a through 3d illustrate how a typical air pressure waveform at the output of one of the ports 17 or 18 would be created as a function of the azimuth angle of the port while the hub 15 is rotating in a counter clockwise direction. No air is flowing out of the port 18 because all of the nozzle passages in the nozzle ring from the zero degree position through the 180° position have been blocked by the programming ring 25. This 180° blocking action is depicted by the waveform in FIG. 3c which is labeled programming ring filter because the programming ring in effect filters out and allows air to flow only when the ports are at azimuth angles between 180 and 360°. The programming ring 25 acts as an on-off switch in this embodiment of the valve system because the ring switches the flow of air off at azimuth angles between 0 and 180° and switches it on at azimuth angles between 180 and 360°. The rise time and fall time of the programming ring filter waveform will be directly proportional to the width of the ports 17 or 18. The speed with which the on-off waveform of FIG. 3c switches from one state to another can be increased by making the width of the ports 17 and 18 smaller with respect to the outside circumference of the nozzle ring. Part of the air which is flowing through port 17 is controlled by cam 19 and part of the air is controlled by cam 20. That portion of the air flow through port 17 which enters the nozzle passages 26 by flowing between the cam 19 and the nozzle passage sidewalls 32 and 21 is referred to as the second cyclic component, because the cam 19 has an oblong shape. The fundamental frequency of the second cyclic component is equal to twice the rate of rotation of the hub 15. That portion of the air flow which enters the nozzle passages 26 from between the cams 19, 20 is labeled the steady component. This component of air pressure does not vary as a function of the azimuth angle of the port. That portion of the air flow which enters into the nozzle air passages 26 by flowing between the cam 20 and the nozzle passage sidewalls 32 and 22 is referred to as the first cyclic component of the air pressure. Cam 20 has a shape which is basically circular but the cam is mounted off center on its shaft 24. The waveform of the first cyclic component will have a fundamental frequency which is equal to the frequency of rotation of the hub 15. The shapes of the two cams 19 and 20 and the way they are mounted on their shafts could be easily varied to give any desired combination of frequency components which may or may not be harmonically related to each other.

Figure 3A:
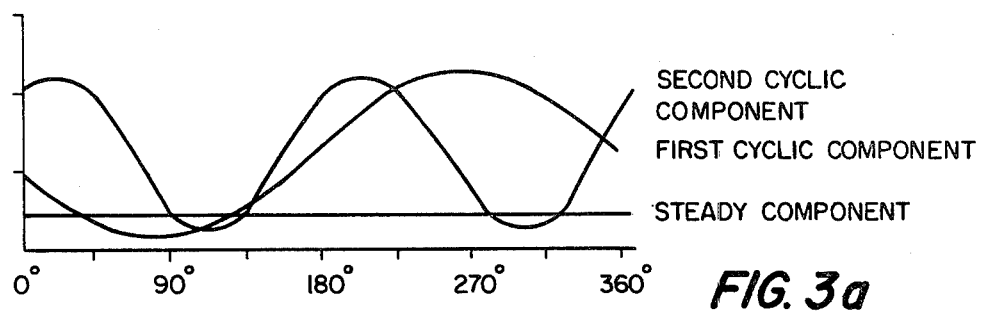
FIGS. 3a through 3g are graphs of air pressure waveforms which might be produced by the invention and which illustrate how the invention operates.
Figure 3B:
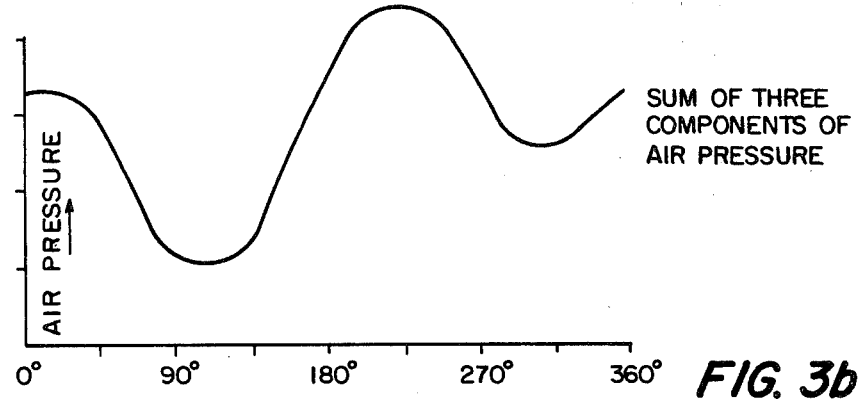
Figure 3C:
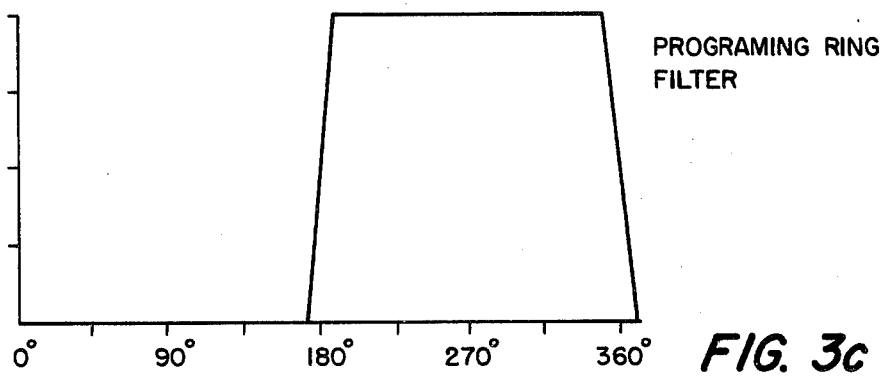
Figure 3D:
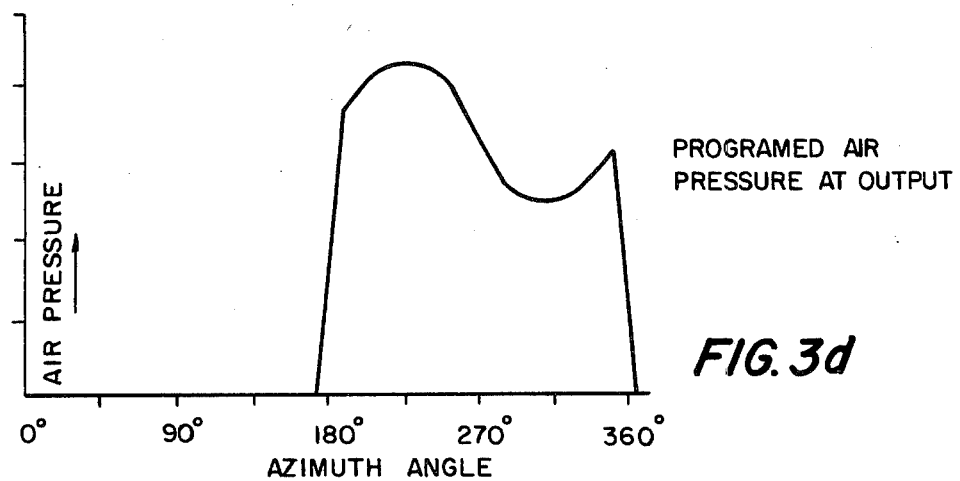

The second cyclic, steady and the first cyclic components of the air pressure which flow through nozzle passages 26 and out port 17 are shown in FIG. 3a. These three components of the air pressure add together to form the combined air pressure waveform of FIG. 3b. The on-off filtering action of the programming ring 25, as depicted by the waveform of FIG. 3c, then filters out part of the combined air pressure waveform of FIG. 3b to produce the resulting output waveform of FIG. 3d.

The strength of the first cyclic component of air pressure can be varied by using shaft 24 to move cam 20 vertically. The phase of the waveform for the first cyclic component can be varied by using shaft 24 to rotate cam 20 in azimuth angle. In a similar manner the strength and the phase of the waveform for the second cyclic component of air pressure can be varied by moving cam 19 vertically and by rotating it in azimuth angle using shaft 23. The strength of the steady component of air pressure can be varied by varying the distance between cams 19 an 20. The programming ring 25 may be rotated so as to filter out different portions of the combined air pressure waveform produced by the two cams.

The simplified embodiment of the valve system shown in FIGS. 1 and 2 has only one valve subsystem which has one port for each of the two blades on the helicopter rotor. A valve system for a circulation control rotor on a high speed helicopter would need to have one valve subsystem for the trailing edge slots on the rotor blades and a second valve subsystem for the leading edge slots. As the operating conditions of the circulation control helicopter rotor are changed, it should be possible to adjust the cams of each valve subsystem independently so as to produce the optimum air pressure waveform. It should also be possible to adjust the programming ring of each valve subsystem independently so as to filter out that portion of the air pressure waveform which is needed and reject the rest of it. For example, the graphs in FIGS. 3e, 3f and 3g show three sets of waveforms that would be needed for a circulation control rotor on a helicopter with high forward speed.

Figure 3E:
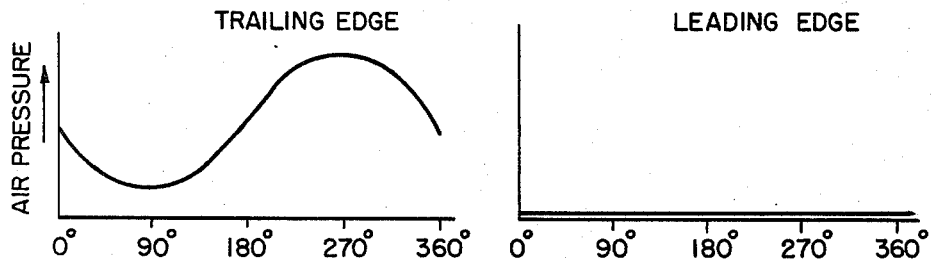
Figure 3F:
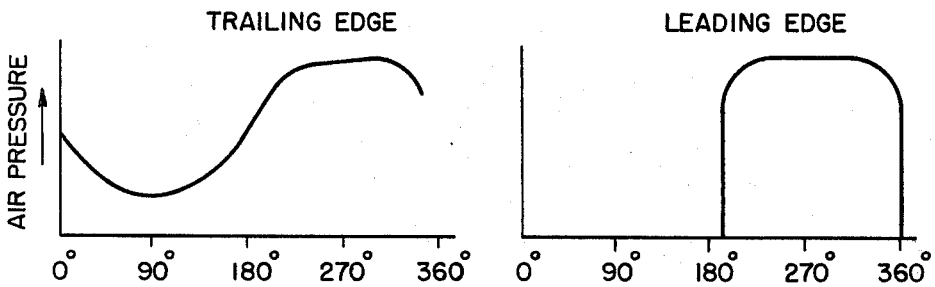
Figure 3G:
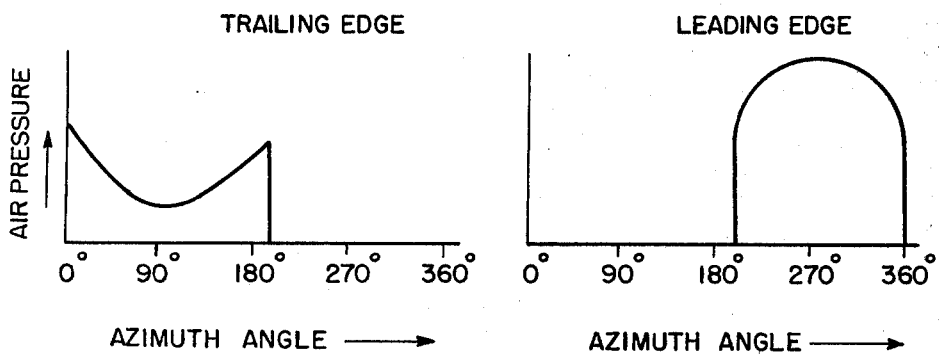
Figure 4:
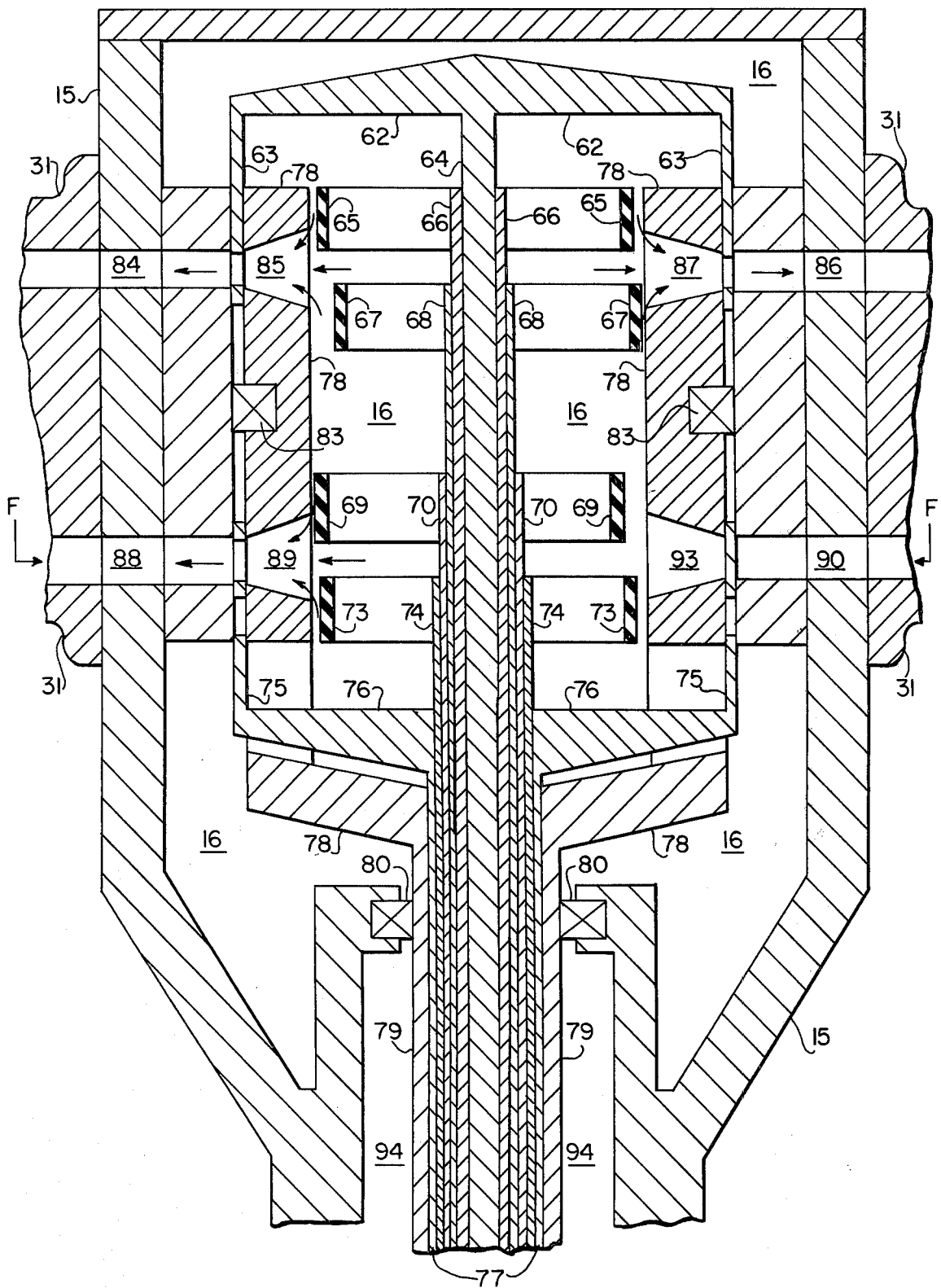
FIG. 4 shows a vertical cross-sectional view of the preferred embodiment of the invention with the cross section taken between the points DD in the horizontal cross-sectional view in FIG. 6.
Figure 5:
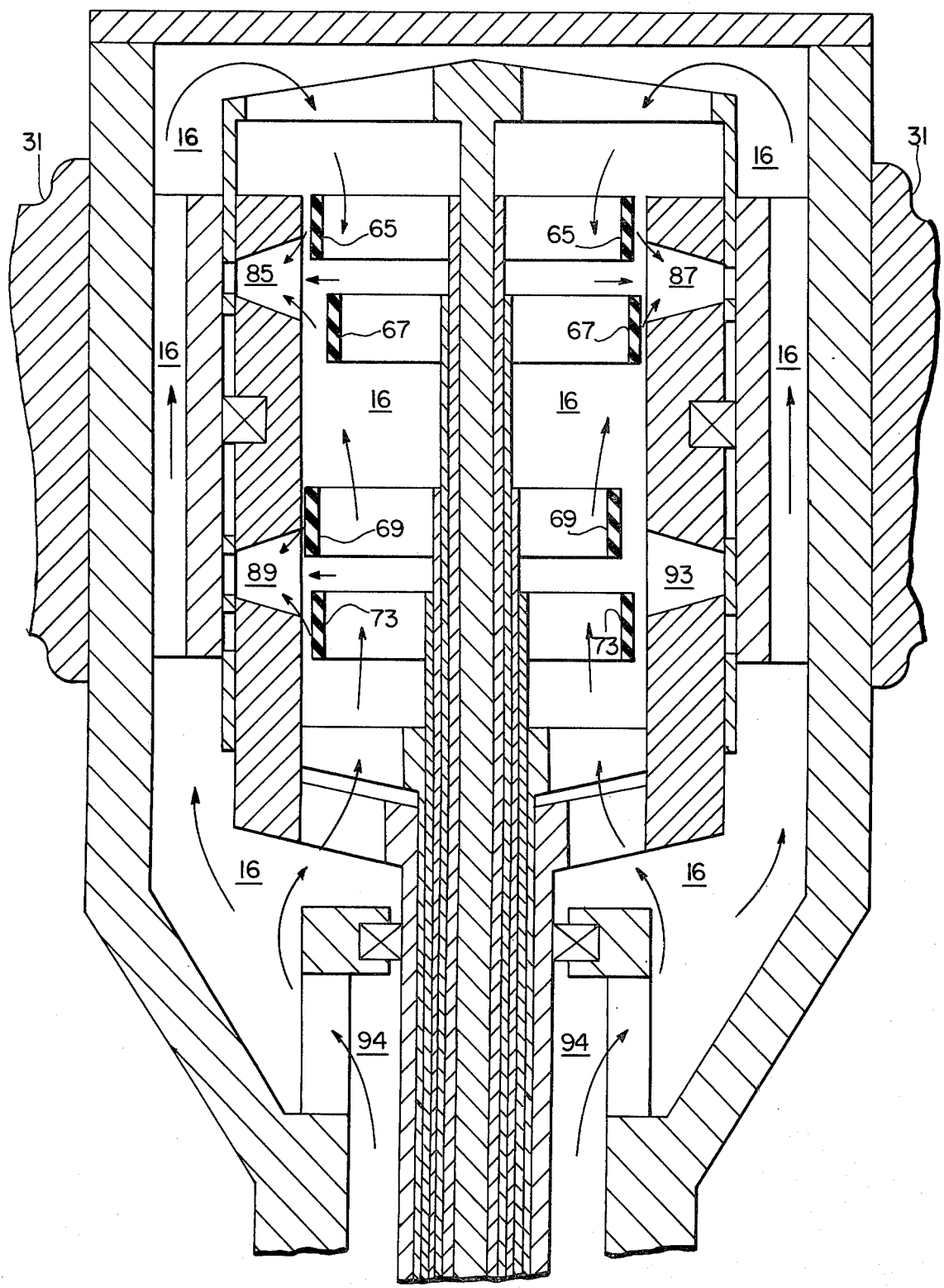
FIG. 5 shows a vertical cross-sectional view of the preferred embodiment of the invention with the cross section taken between the points EE of the horizontal cross-sectional view shown in FIG. 6.
Figure 6A:
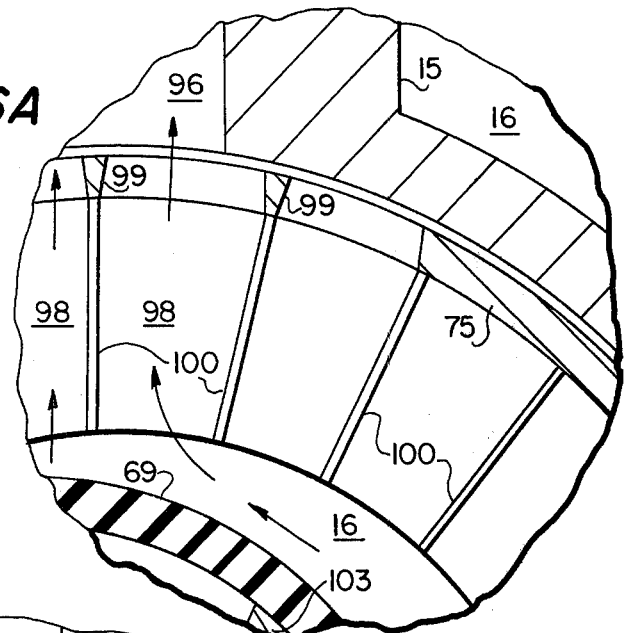
FIG. 6A shows an enlarged view of one portion of FIG. 6.
Figure 6:
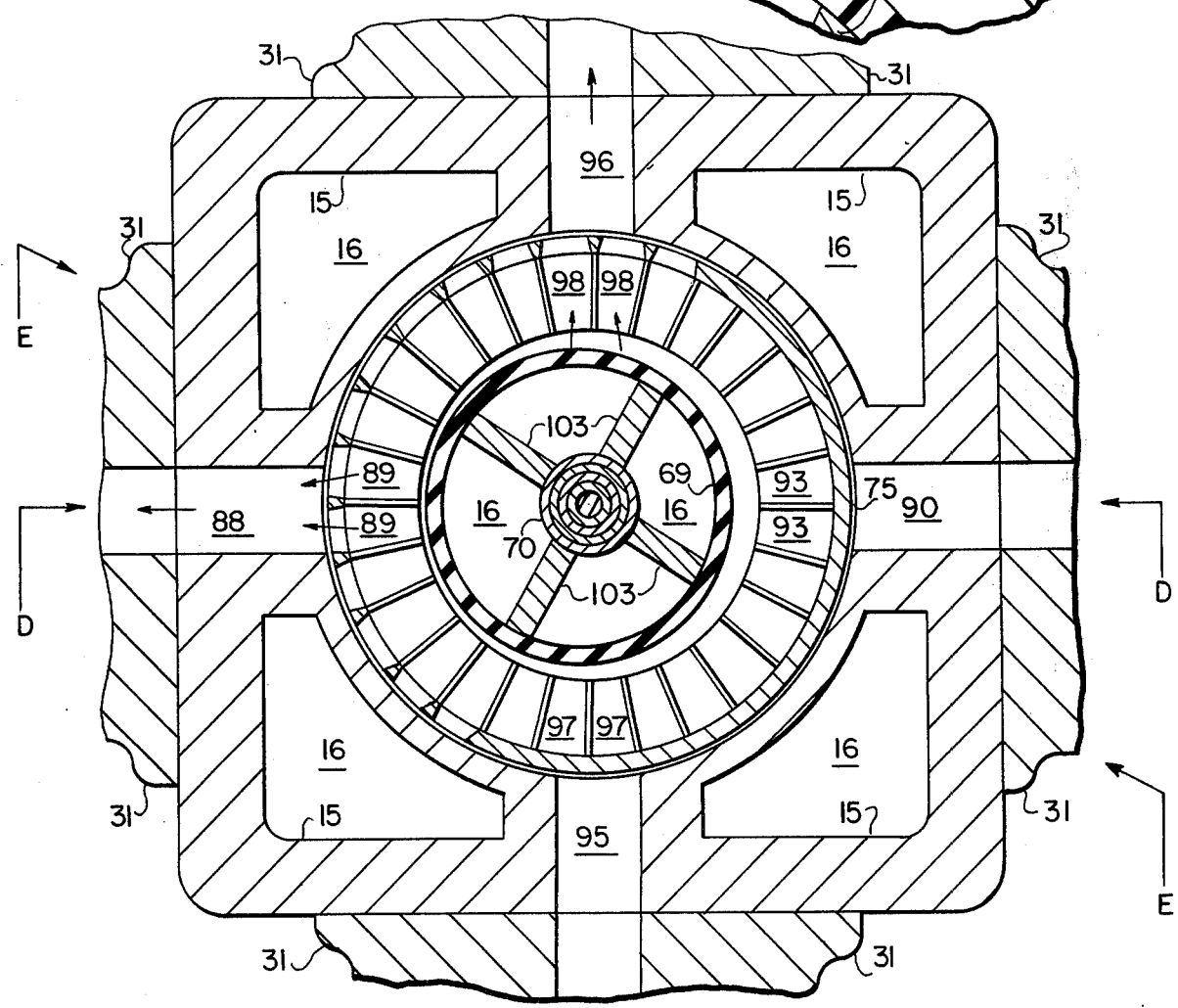
FIG. 6 shows a horizontal cross-sectional view of the preferred embodiment of the invention, with the cross section taken between the points FF of the vertical cross-sectional view shown in FIG. 4.
Figure 7:
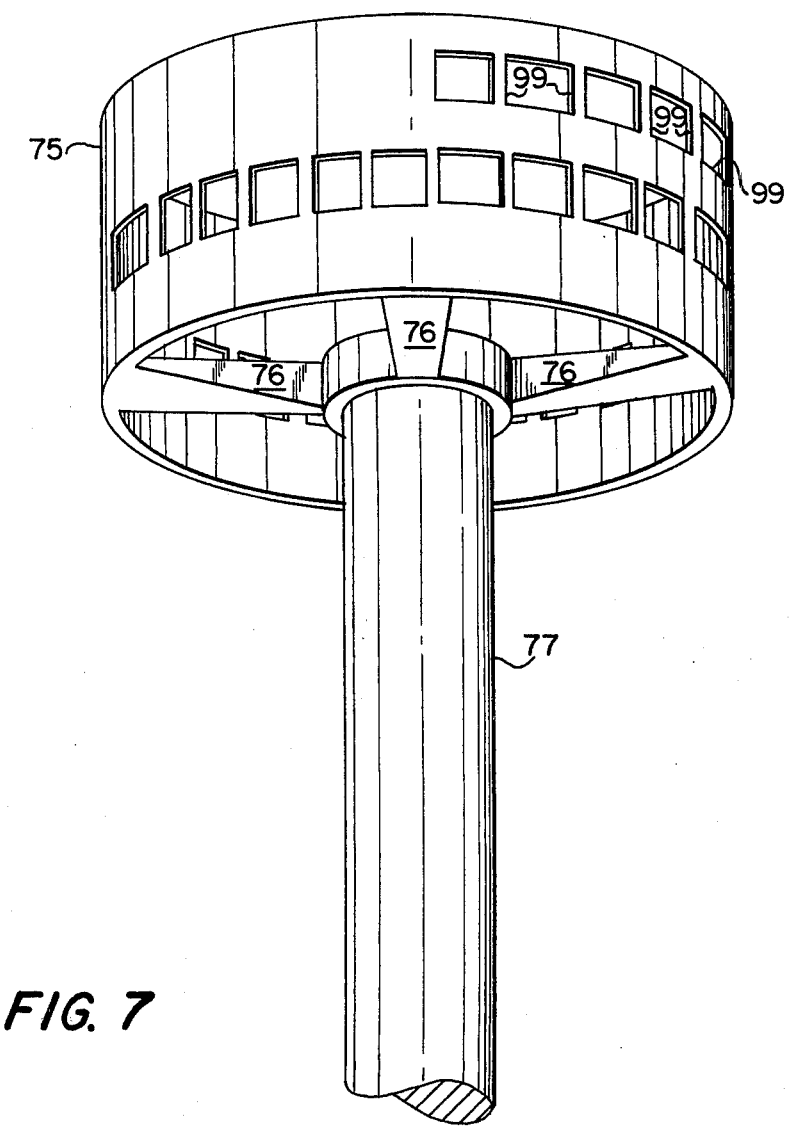
FIG. 7 shows a three dimensional view of the lower programming ring which is also shown in the cross-sectional views of FIGS. 4, 5, and 6.

FIGS. 4, 5, 6 and 7 illustrate a preferred embodiment of the invention which would be capable of producing the three sets of waveforms which are shown in FIGS. 3e, 3f, and 3g, as well as a very large number of other waveforms. FIG. 4 shows a vertical cross-sectional view of the valve system taken between the points DD in the horizontal cross-sectional view of FIG. 6. FIG. 5 is a vertical cross-sectional view of the valve system taken between the points EE in FIG. 6. FIG. 6 is a horizontal cross-sectional view of the valve system taken between the points FF in FIG. 4. FIG. 7 shows a three dimensional view of the lower programming ring 75 and the attached shaft 77 which are also shown in the cross-sectional views of FIGS. 4, 5 and 6.

As in the preceding discussion, the hub 15 of the circulation control helicopter rotor contains a plenum 16 of pressurized air. The four individual blades 31 of the rotor are attached around the outside surface of the hub 15. This embodiment of the valve system has two valve subsystems. The first valve subsystem regulates the air pressure provided to the leading edge slots of the four rotor blades through ports 88, 95, 90, 96 in the plenum chamber. The second valve subsystem regulates the air pressure provided to the trailing edge slots of the four blades through four ports in the plenum chamber including ports 84, 86. The horizontal cross-sectional view of FIG. 6 is taken through that portion of the valve system which comprises the first valve subsystem. The rotor hub 15, which also serves as a plenum chamber, will be rotating with the rotor blades, but all of the programming rings, nozzle rings and control cams of the valve system will be relatively stationary. The two bearings 80 and 83 serve to hold the cams, nozzle rings and programming rings in their proper positions with the respect to the rotating hub 15.

The upper programming ring 63 is attached to shaft 64 by means of radial arms 62. Cam 65 is attached to shaft 66 and cam 67 is attached to shaft 68 by radial arms. The lower programming ring 75 is attached to shaft 77 by means of the radial arms 76. The cam 69 is attached to shaft 70 and the cam 73 is attached to shaft 74 by radial arms. The cylindrical nozzle ring structure 78 is attached to shaft 79. All of the shafts 79, 77, 74, 70, 68, 66, 64 are concentric with each other and can be rotated with respect to each other. In addition, all of the shafts except shaft 79, which is connected to the nozzle ring structure 78, can be independently moved up and down in the vertical plane.

The arrows in the cross-sectional view of FIG. 5 shows how the pressurized air travels through the air passage 94 of the main rotor shaft into the main plenum 16 and circulates throughout the plenum before flowing by the cams 65, 67, 69, 73 and into nozzle passages 85, 87, 89, 93. Within the main plenum 16 the air flows between the arms which connect the upper programming ring 63 with its corresponding shaft 64, between the arms (not shown) which connect the cams with their respective shafts, between the arms 76 which connect the lower programming ring 75 with its corresponding shaft 77, and through various holes in the lower part of the nozzle ring structure 78.

By rotating the programming rings 63, 75 it is possible to change the sector of azimuth angles over which the air pressure waveform is filtered, but not to change the size of that angular sector. Rotating the programming rings has the effect of causing a phase shift in the filtering action of the programming ring. As shown in FIG. 7, the lower program ring has two sets of holes which are arranged around its circumference. Only one set of these holes is in use at any one time. The position shown for the lower programming ring 75 in FIGS. 4 and 5 is such that the upper set of holes is being used but the lower set is not. The angular sector over which the lower program ring 75 allows the air to flow through to the rotor blades 31 could be changed in the illustrations of FIGS. 4 and 5 by raising the programming ring 75 so that the lower set of holes are in use and the upper set of holes are not in use. Therefore, the programming ring 75 has two separate filters, only one of which is in use at any one time and both of which can be shifted in phase by rotating the ring. The upper programming ring 63 also has two sets of holes and it operates in the same manner as the lower programming ring 75.

The horizontal cross-sectional view of FIG. 6 is taken through the upper set of holes in programming ring 75 and through cam 69. The expanded view in FIG. 6A shows the area around the port 96 and nozzle passages 98. The programming ring 75 in the position shown in FIG. 6 is blocking the flow of air through the nozzle passages 93 to port 90 and through nozzle passages 97 to port 95. The programming ring is allowing air to flow through nozzle passages 98 and out port 90 and also through nozzle passages 89 out port 88. The direction of flow of air in FIGS. 6 and 6A is indicated by the arrows. The individual holes about the circumference of the programming ring are separated by dividers 99, which are inserted for the purpose of holding the different parts of the ring together and providing structural strength. As is shown in the expanded view of FIG. 6A, the spacing between the supports 99 is the same as the spacing between the individual nozzle passage sidewalls 100. When in operation the programming ring supports 99 and the nozzle passage sidewalls 100 will always be aligned with each other as shown in FIG. 6A. Having the programming ring supports 99 and the nozzle passage sidewalls 100 equally spaced and aligned in this matter forces all the air which flows out through an open port 96 or 88 to flow only through those nozzle passages 98, or 89 which are directly opposite that port. An alternative structure which could be used to accomplish the same result would be to eliminate the dividers 99 and place flexible flap type seals on the outer ends of each of the nozzle passage sidewalls 100. The seals would have to be flexible enough to fill in the gap between the interior cylindrical wall of the hub and the ends of the nozzle passage sidewalls and yet bend out of the way where the programming ring fills this gap. The nozzle passage sidewalls 100 and supports 99 allow air to flow out the ports only if it is regulated by that portion of the cams directly opposite the open ports. Without some kind of structure similiar to these sidewalls and supports, the cams would be less effective in generating air pressure waveforms. Leakage of air from adjacent nozzle passages into ports 96 or 88 by way of the gap between the programming ring 75 or one of its supports 99 and the interior cylindrical wall of the hub 15 can be minimized by making the gap as small as possible or by using various types of seals which are well known in the art. In a similiar manner, close tolerences or conventional seals can be used to minimize any unwanted air flow between the plenum 16 and one of the ports along the gap between the programming rings 75 or 63 and the nozzle ring 78 or the gap between the programming rings and the hub 15. The size of the gap between the programming rings 63, 75 and the interior cylindrical surface of the hub 15 need only be large enough so that the two surfaces will not touch each other while the hub is rotating. As is shown in FIG. 6, the interior surfaces of the hub 15, the programming ring 75, and the ring of nozzle passages all form cylindrical surfaces which have the same common central axis. This common central axis is also the central axis of all the various shafts which control the cams and programming rings. However, the cams need not have cylindrical shapes. Most of the cams will be mounted asymetrically such as is cam 69 in FIG. 6. Cam 69 is mounted by means of arm 103 to shaft 70 and is offset toward the nozzle passages 89 and away from the nozzle passages 93.

This preferred embodiment allows a very high degree of control over the air pressure waveforms which are produced by each of the two valve subsystems. The phase of the frequency components added to the waveform by each of the cams can be shifted by rotating the cams. The magnitude of the frequency components added to the waveform by each of the two cams can be increased or decreased by moving the cams vertically. The amount of steady air flow producing a constant pressure can be varied by changing the distance between the two cams. The combined air pressure waveform produced by the cams can be programmed on or off for individual rotor blades by the action of the programming ring. The sector of azimuth angles over which the combined waveform is programed on or off can be shifted in phase by rotating the programming ring. Both the phase in azimuth of this angular sector and its magnitude can be changed by moving the programming ring vertically from one of its two positions to the other. The programming ring could be programmed to alternately switch the flow of air on or off several times throughout one rotation of the plenum chamber. The speed at which the combined air pressure waveform is turned on or off by the programming ring can be made very fast by making the width of the ports very small with respect to the circumference of the programming ring.

Figure 8:
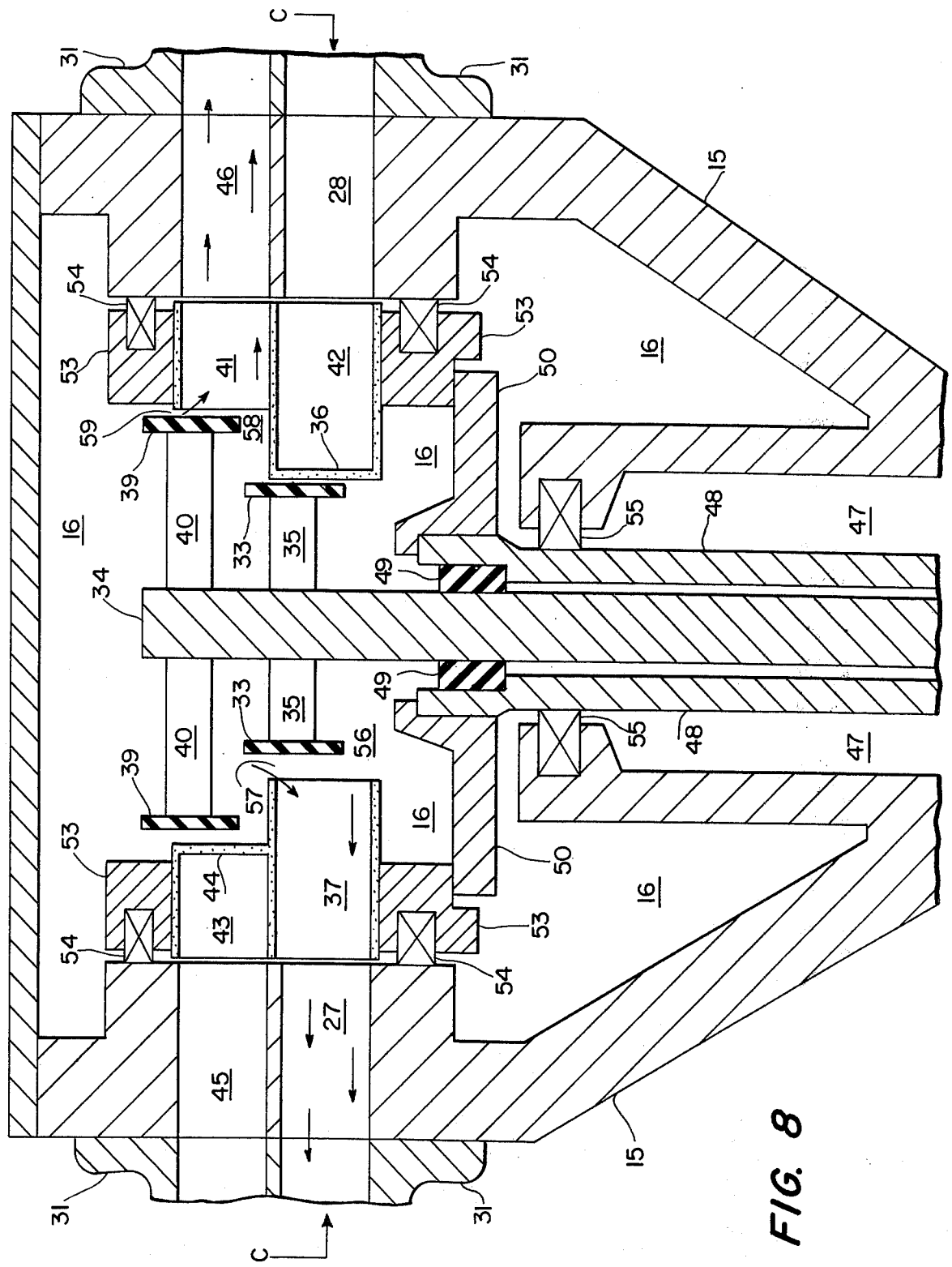
FIG. 8 shows a vertical cross-sectional view of the first alternative embodiment of the invention with the cross section taken between the points AA in the horizontal cross sectional view shown in FIG. 9.
Figure 9:
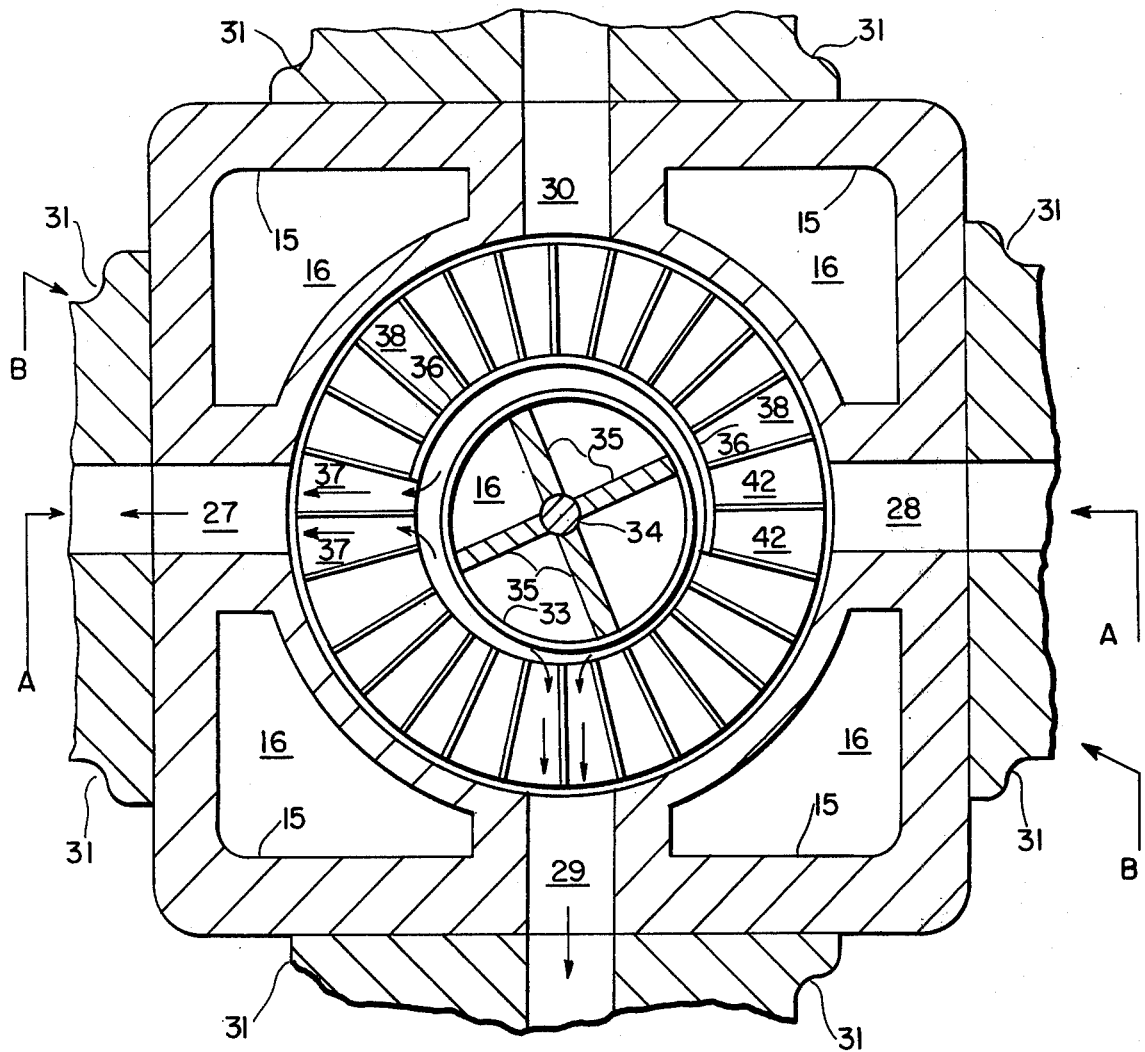
FIG. 9 shows a horizontal cross-sectional view of the same embodiment of the invention as shown in FIG. 8, with the cross section taken between the points CC in FIG. 8.
Figure 10:
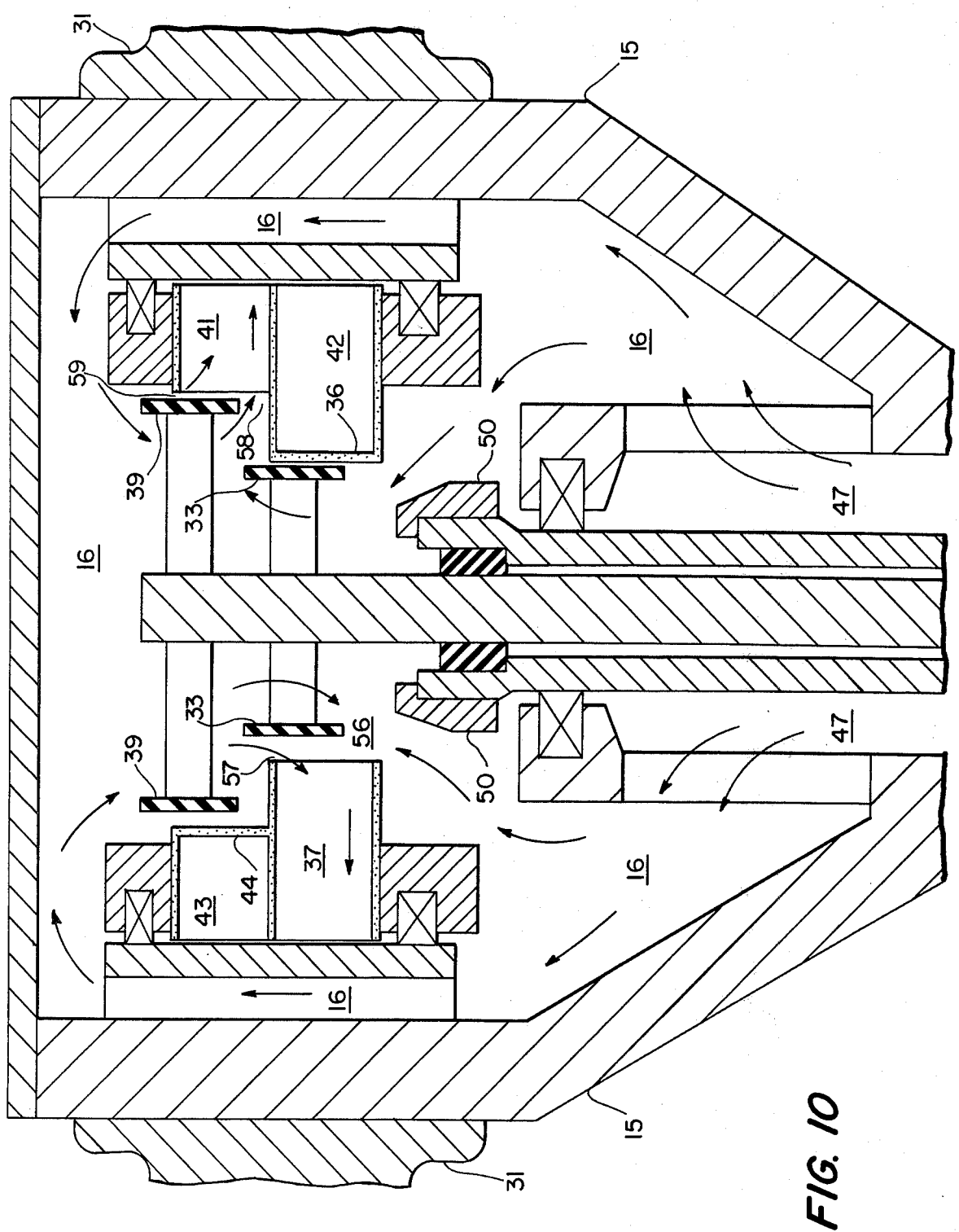
FIG. 10 shows another vertical cross-sectional view of the alternative embodiment of the invention depicted in FIG. 8, with the cross section taken between the points BB in the horizontal cross-sectional view of FIG. 9.

FIGS. 8, 9, and 10 illustrate one of the alternative embodiments of the invention. The valve system in this embodiment also independently regulates the air pressure through two different valve subsystems. The valve system in this alternative embodiment is simplier and does not require as much space within the rotor hub as does the preferred embodiment. This alternative embodiment may be preferrable for use in those circulation control helicopter rotor systems where the height dimension of the rotor hub is too limited to allow installation of the preferred embodiment or in those applications where the greater flexibility of the preferred embodiment is not needed.

The view of this alternative embodiment shown in FIG. 8 is a vertical cross section taken between the points AA of the horizontal cross section shown in FIG. 9. The view shown in FIG. 10 is a vertical cross section taken between the points BB of the horizontal cross section shown in FIG. 9. The view shown in FIG. 9 is a horizontal cross section of the valve between the points CC of the vertical cross section shown in FIG. 8.

The first valve subsystem provides air pressure to the leading edge slots of the blades 31 through the ports 27, 28, 29, 30. The second valve subsystem provides air pressure to the trailing edge slots of the blades 31 through four ports including ports 45, and 46. The waveform of the air pressure provided to the first valve subsystem is regulated by cam 33, and the air pressure waveform for the second valve subsystem is regulated by cam 39. Cam 39 is connected to shaft 34 by means of arms 40 and cam 33 is connected to shaft 34 by means of arms 35. The programming nozzle ring 53 is mounted inside the interior cylindrical surface of the hub 15 by means of bearings 54. The bearing 55 supports the shaft 48 in its proper position which in turn supports shaft 34 in its proper position by means of bearings 49. The shaft 48 does not exert any vertical or horizontal forces on the programming nozzle ring 53 by way of the arm 50. The purpose of arm 50, mounted on the shoulder of shaft 48, is to control the angular position of the ring 53. The arrows in the vertical cross-sectional view of FIG. 10 show how the air flows through the air passage 47 of the main rotor shaft into the air plenum 16 and around the air plenum past the cams 33, 39 into the nozzle passages 41, 42, 43, 37. Leakage of air from the plenum chamber through the bearings into one of the nozzle passages, or from one of the nozzle passages to another along the gap between the plenum chamber and the nozzle passage sidewalls, can be reduced by any number of seals well known to those skilled in the art. While this embodiment of the valve is in operation, the hub 15 will be rotating while the cams 33, 39 and the programming nozzle ring 53 will be stationary.

This alternative embodiment does not have separate programming rings which are movable with respect to a nozzle ring as in the preferred embodiment. The functions of both the nozzle ring and the programming rings are performed in this embodiment by the programming nozzle ring 53. Some of the inward facing openings of the nozzle passages in the programming nozzle ring 53 are closed off by blocking structures 36, 44. Air will be allowed to flow only through the other nozzle passages which are not closed off. The size and position of these blocking structures 36, 44 on the inside surface of the programming nozzle ring 53 are permanently fixed and cannot be changed while the valve is in operation. Because the shape of the air pressure wave produced by the cams is determined by the distance between each part of the cam and the adjacent portion of the ring, it is important that the blocking structures 36, 44, be placed on or inside the ring 53 in such a way as to not change this distance. This could be accomplished, for example, by simply placing an insert into the inward facing opening of each nozzle passage that is to be blocked. This valve system would work equally well if these blocking inserts were placed in the same nozzle passages at their outward facing openings or somewhere in the middle.

As shown in FIG. 10, the amount of air that flows into nozzle passage 41 will be determined by the size of the gaps 59 and 58. Similarly, the amount of air which flows into nozzle passage 37 will be determined by the size of the gaps 57 and 56. The gaps 56, 58 will be of constant size around the circumference of the cam and ring sturcuture, and therefore the air flowing through gaps 56, 58 will produce the steady component of the resulting air pressure waveform. The size of the gaps 59, 57 will vary as a function of the angular position around the edge of the cam and will thereby determine the shape of the cyclic components of the air pressure waveform.

In this embodiment, the shape of the air pressure waveforms will be fixed and cannot be changed without changing the cams. The amplitude of the air pressure waveforms can be changed by moving the cams vertically. However, since both cams are connected to the same shaft 34, the amplitudes of the air pressure waveforms in the two valve subsystems will have a fixed relationship to each other. Similarly, the amplitude of the steady components of the air pressure waveform can be adjusted by moving the cams vertically. However, the amplitudes of the steady components of the air pressure waveforms in the two valve subsystems will have a fixed relationship to each other because both cams are attached to the same shaft. The phase angle of the air pressure waveforms of the two valve subsystems can also be shifted by rotating the shaft 34 to which the cams are connected, but these phase angles will always have a fixed relationship to each other.

FIG. 11 shows a vertical cross-sectional view of a second alternative embodiment of the invention. This embodiment also has two valve subsystems but they are not completely independent of each other. One valve subsystem provides air pressure to the leading edge slots of the rotor blades through ports 109, 113. The other valve subsystem provides air pressure to the trailing edge slots of the rotor blades through ports 108, 110. The air flow into each of these ports is programmed on or off by four rings of holes in the programming ring 116. These four rings of holes are divided into two sets of two rings each with only one of these sets in use at any given time. When the programming ring 116 is in the position shown in FIG. 11, the upper set of holes in the programming ring is in use. The cross sectional view of FIG. 11 shows this upper set of holes in the programming ring allowing air to flow into the ports 110, 113 and 108 but blocking the flow of air into port 109. The lower set of holes 114, 115 in the programming ring 16 will allow air to flow to ports 110, 113 and 109 but will block the flow of air through port 108. Therefore, the size of the angular sector within which air is allowed to flow out through each of the ports can be changed by moving the programming ring from its lower position to its upper position. The phasing of these angular sectors may be shifted by rotating the programming ring. However, the size of these angular sectors can be programmed in only two different ways since there are only two positions for the programming ring 116. Because all of the ports are programmed by the same programming ring, it is not possible to change the programming for one of the ports without also changing the programming for the other ports. The programming ring is moved vertically and rotated about its axis by means of arms 117 which are attached to a shaft. The arms 117 extend through slots around the circumference of the nozzle ring 118.

The waveform of the air pressure for both of the valve subsystems is regulated by the two cams 104, 105 which are in turn moved vertically and rotated by their respective shafts 119, 120. Each of these two valve subsystems will receive the same air pressure waveform produced by the two cams 105, 104. Because both of the two valve subsystems received their air flow from the same nozzle passages 106, 107, most of the differences between waveforms at the output of the two subsystems will be caused by the programming ring, which has separate holes for each subsystem. There will be a tendency, however, for a greater portion of the air flow regulated by cam 104 to flow through the upper parts of nozzle passages 106, 107 and into the ports 108, 110 than to flow into the ports 109, 113. Similarly, a greater portion of the air flow regulated by cam 105 will travel out through ports 113, 109 than will travel out through the ports 110, 108. Therefore, the cam 104 will have a greater effect on the trailing edge subsystem than on the leading edge subsystem and the cam 105 will have a greater effect on the leading edge subsystem than on the trailing edge subsystem. This phenomena results because of air flow stratification in the nozzle passages 106, 107. This air flow stratification and its corresponding effect can be minimized, if desired, by using standard techniques known in the art.

A horizontal cross-sectional view of the embodiment shown in FIG. 11 taken through the nozzle passages 106, 107 and through cam 104 would look the same as the horizontal cross-sectional view of the preferred embodiment shown in FIG. 6. The nozzle ring would be divided by the nozzle passage sidewalls into a large number of individual nozzle passages, and the open portions of the programming ring will have supports 99 which are equally spaced at the same interval as are the nozzle passage sidewalls 100.

FIG. 12 illustrates a vertical cross-sectional view of a third alternative embodiment of the invention. In this embodiment of the invention, as was true in the first alternative embodiment shown in FIGS. 8, 9, 10, there is one programming nozzle ring 147 instead of separate programming rings and nozzle rings. As was done in the first alternative embodiment, the programming function is accomplished by closing off the openings of some of the nozzle passages in the programming nozzle ring 147. In this embodiment, unlike in the first alternative embodiment, there are three sets of nozzle passages that can be used with each subsystem of the valve. The particular set of nozzle passages which are in use at any given time can be changed by moving the entire programming nozzle ring 147 vertically using shaft 148. When this valve is in operation, the hub 15, will be rotating with the rotor but the programming nozzle ring 147 as well as the cams will be stationary. The two bearings 153 and 154 will hold the programming nozzle ring and the cams in their proper positions. Slip rings 149 are inserted between the shaft 148 and the bearing 154 and also between the shaft 150 and the bearing 153, to allow the programming nozzle ring to move vertically. The shaft 150 is attached to the hub 15 and will rotate along with the hub. The trailing edge subsystem of the valve system will provide air pressure to the rotor blades 31 through the ports 123, 125 and one of three possible groups of programming nozzle passages. The first group of programming nozzle passages 127, 128 are positioned in FIG. 12 so that they are in use. The second group of passages 133, 134 and the third group 137 and 138 may also be used with the trailing edge subsystem. The leading edge subsystem includes ports 124 and 126. The first group of nozzle passages 129, 130, corresponding to the leading edge subsystem, are positioned in FIG. 12 so that they are in use. The second group of nozzle passages 135 and 136 and the third group 139, 140, may also be used with the leading edge subsystem. A horizontal cross-sectional view of this embodiment of the valve system taken either between ports 123 and 125 or between 124 and 126 will be the same as the horizontal cross-sectional view shown of the preferred embodiment in FIG. 6 except that the nozzle ring and the programming ring are not separate parts movable with respect to each other. The main air plenum 16 in this embodiment of the invention would be filled with pressurized air from the main rotor shaft air passage 94 in the same manner as for the preferred embodiment of this invention shown in FIG. 5. FIG. 12 shows the programming nozzle ring as having a cylindrical shape with the cylindrical shape with the cylindrical walls having a substantial thickness. It would be possible to make the cylindrical walls, containing the groups of nozzle passages, as thin as the walls of the programming ring illustrated in FIG. 7.

When in operation, this embodiment of the valve system would provide control over the air pressure waveforms in the helicopter blades similar to that provided by the preferred embodiment. The waveform of the air pressure output of each subsystem can be varied independently of the other subsystem by moving either or both of the two cams vertically or by rotating them. In addition, the programming of each of the subsystems can be changed by moving the programming nozzle ring vertically to switch from the first group of nozzle passages to the second group or to the third group.

There are many possible variations from the design of the valves shown in the drawings. The programming rings may be built so that the flow of pressurized air will be switched off or on over any number of angular sectors of varying sizes within the 360 degree azimuth rotation of the helicopter rotor. In all of the valves shown in the drawings, the inward facing nozzle passageway openings form a cylindrical surface which has the same central axis as does the cylindrical programming ring and the interior cylindrical surface of the plenum chamber. In all of these embodiments it is the cams which are asymmetrical in shape or at least asymmetrically mounted with the respect to the central axis of the cylindrical surfaces. This asymmetry of the cams results in varying distances between the cams and the cylindrical surface formed by the circle of inward facing openings of the nozzles. Any of the valve systems discussed above could be designed so that the surface formed by the ring of inward facing nozzle openings would not be cylindrical in shape or would not be symmetrical about the central axis of the interior cylindrical plenum chamber surface. With the cams systems which are shown in the drawings, the cyclic components of the air pressure waveforms are produced entirely as a result of varying distances between the outside surface of the cam and the inside surface of the nozzle ring structure at different azimuth angles. That component of the air pressure waveform which resulted from air flowing between the two cams directly into the nozzle passage was always a steady component in the above drawings. However, where two or more cams are used to control the air flow into one ring of nozzle passages, the distance between the cams could be varied as a function of azimuth angle to provide an additional cyclic component of air pressure. Even when only one cam is used, cyclic components of air pressure could be produced by varying the vertical dimensions of the cam. All of the drawings have shown either one or two cams used to regulate the flow of air through the nozzle passages for each subsystem of a valve. However, any number of cams can be used to control the air flow through one subsystem of the valve. Neither is this invention limited to valves which have only one or two subsystems since the basic structure of the two subsystem valves shown in the drawings can be easily extended to any number of subsystems. All of the valves have been illustrated and discussed in terms of their potential use for controlling air pressure to the slots on the edges of blades for a circulation control helicopter rotors. However, these valves may have many other uses which will not require that the outside shell of the plenum chamber be constantly rotating. It would be possible for all the valves illustrated to function by holding the outside shell of the plenum chamber stationary while the cams, nozzle rings, programming rings and programming nozzle rings are rotating. Neither is it necessary that the cams and any of the rings be held stationary with respect to each other. By inserting bearings in the proper places, it would be possible for the cams to be rotating continuously with respect to the programming rings and thus to make the fundamental frequency of the cyclic component of air pressure provided by the cams different from the fundamental frequency of the programming function provided by the programming rings. Neither are these valves limited to controlling the flow of air as they will work with any fluid. The prior art discloses several types of valves that may be used to generate periodic air pressure waveforms for circulation control rotors. It would be possible to combine the programming nozzle rings or programming rings of this invention with these prior art valves to turn on and off the flow of pressurized air to the rotor blades.

Obviously, many modifications and variations of this invention are possible in light of the above teachings. It is therefore to be understood that within the scope of the appended claims that the invention may be practiced otherwise than as specifically described.

What is claimed is:

1. A valve comprising:
a plenum chamber having an interior cylindrical surface;
inlet means for directing the flow of pressurized fluid into the plenum chamber;
outlet means for directing the flow of pressurized fluid out of the plenum chamber;
cam means for modulating the flow of pressurized fluid through said plenum chamber between said inlet means and said outlet means, the cam means including at least one cam positioned within the space enclosed by the cylindrical surface of said plenum chamber;
programming means for turning on and off the modulated flow of pressurized fluid through said outlet means and controlling the direction of fluid flow between said cam means and said outlet means, said programming means being located between said outlet means and said cam, and said outlet means being rotatable relative to said cam and said programming means.

2. A valve as claimed in claim 1 wherein:
said programming means includes an annular member having cylindrical inner and outer surfaces;
said annular member includes a nozzle ring having a plurality of passages extending from the interior to the exterior of said nozzle ring;
said annular member being mounted within and coaxially of said cylindrical surface of said plenum chamber;
said annular member being adjustable to align said passages with said outlet means.

3. A valve as claimed in claim 2 including means to adjust said annular member axially and rotatably.

4. A valve as claimed in claim 2 wherein:
said programming means further includes a programming ring mounted coaxially with and surrounding said nozzle ring;
said programming ring having a plurality of openings spaced circumferentially around said ring;
said programming ring being adjustable both axially and rotatably to align selected openings of said programming ring with selected passages of said nozzle ring.

5. A valve as claimed in claim 2 in which said programming means and said plenum chamber are relatively rotatable.

6. A valve as claimed in claim 5 in which:
said outlet means includes a plurality of ports circumferentially spaced around said cylindrical surface of said plenum chamber; and
selected ones of said plurality of passages are periodically closed relative to selected ones of said plurality of ports as said plenum chamber and said programming means are relatively rotated.

7. A valve as claimed in claim 1 in which said outlet means includes a plurality of ports spaced circumferentially around said cylindrical surface of said plenum chamber.

8. A valve as claimed in claim 7, in which said ports are spaced axially as well as circumferentially of said cylindrical surface.

9. A valve as claimed in claim 1 in which said plenum chamber and said programming means are continuously relatively rotatable.

10. A valve as claimed in claim 1 in which:
an air foil having blowing slots is attached to said plenum chamber;
said outlet means being connected to direct flow of fluid from said plenum chamber to said air foil.

11. A valve as claimed in claim 1 in which:

said programming means is mounted concentrically inside said cylindrical surface of said plenum chamber, each programming means including a member having an inside cylindrical surface and an outside cylindrical surface which is approximately the same diameter as said cylindrical surface of said plenum chamber, a plurality of passages extending from the inside surface of said member to the outside surface of said member;

said member being positioned so that as the programming means and the plenum chamber are rotated with respect to each other about the common axis of their concentric cylindrical surfaces, a plurality of said passages will successively become aligned with said outlet means at least once during each revolution so that fluid may flow from the interior of the plenum chamber through the passages and out said outlet means.

12. A valve as claimed in claim 11 in which said cam means is mounted near said inside cylindrical surface of said member so as to restrict the flow of fluid from said plenum chamber into the passages of said member and to control the pressure of the fluid as it flows out said outlet means from said plenum chamber.

13. The valve of claim 12 wherein:
said passages in said member are positioned in groups, with the number of groups being as few as one, each group containing a plurality of passages, all of the passages in each group being the same size and shape, and all the passages in a group intersecting a single plane surface which is approximately perpendicular to the axis of the outside cylindrical surface of the programming means;
said cam means comprises a plurality of cams arranged in sets, with any one set containing as few as one cam, all of the cams in each set regulating the flow of fluid into only one group of passages at a time, and each of said sets of cams regulating fluid flow into a different group of passages;
said outlet means including a plurality of ports in said plenum chamber said ports being positioned in sets, with the number of sets being as few as one, the number of ports in each set being as few as one, and all ports in any one set intersecting a single plane surface which is approximately perpendicular to the axis of the inside cylindrical surface of said member.

14. The valve of claim 13 wherein:
said cams can be moved axially with respect to each other along the axis of the outside cylindrical surface of the programming means so that the same set of cams can be used to regulate fluid flow into any one of at least two different groups of passages.

15. The valve of claim 13 wherein:
said programming means further comprises a nozzle ring means and program ring means, with said program ring means mounted concentric with said nozzle ring means, all the passages of the programming means being opened through said nozzle ring means, and the size, shape, and position of said program ring means being adjustable so that each of the passages through the nozzle ring means can be opened and closed by moving the program ring means with respect to the nozzle ring means.

16. The valve of claim 13 wherein:
all rotational movements of the cam means, programming means and plenum chamber are around the same axis.

17. The valve of claim 13 wherein:
each of said passages in at least one of the groups of passages of said programming means splits into at least two different individual passages which lead to different sets of said ports in the plenum chamber.

18. A fluid pressure control system, containing a plurality of fluid control elements whose shape and relative position are defined by a set of concentric cylindrical surfaces about a common central axis, comprising:
a plenum chamber supplied with pressurized fluid, said plenum chamber having an interior cylindrical surface and having outlet means;
said outlet means including at least one port through said cylindrical surface of said plenum chamber by which fluid may flow out of said plenum chamber;
a programming means including an annular means mounted inside said plenum chamber, with said annular means having concentric outside and inside cylindrical surfaces coaxial with said common central axis, the diameter of said outside cylindrical surfaces being as large as possible without preventing said plenum chamber from rotating freely about said common central axis while said annular means is being held stationary, said annular means having a plurality of passages along paths which are radial to the common central axis and through which fluid may flow between said inside and said outside cylindrical surfaces, said passages in said annular means, together with said ports in said plenum chamber being positioned so that as said plenum chamber is rotated about its central axis, at least one of said ports will become aligned with a plurality of said passages in said annular means during each revolution;
flow regulating cam means mounted inside said programming means with an axis of rotation concentric with said common central axis, with said cam means having at least one control surface which can be positioned so as to limit the flow of fluid through at least one of said passages in said annular means.

19. The fluid pressure control system of claim 18 wherein:
said passages in said annular means are positioned in groups, with the number of groups being as few as one, each group containing a plurality of the passages, all of the passages in each group being the same size and shape, and all the passages in a group intersecting a single plane surface which is approximately perpendicular to said common central axis of said system;
said flow regulating cam means includes a plurality of cams said cams being arranged in sets, with any one set containing as few as one cam, all of the cams in each set regulating the flow of fluid into only one group of said passages at a time, and each set of cams regulating fluid flow into a different group of the passages;
said outlet means includes a plurality of ports in said plenum chamber;
said ports being positioned in sets, with the number of sets being as few as one, the number of ports in each set being as few as one, and all ports in any one set intersecting a single plane surface which is approximately perpendicular to said common central axis of said system;

said groups of passages, said sets of ports and said sets of cams being selectively arranged to form channels with each channel comprising one set of cams, at least one group of passages and at least one set of ports, such that the fluid flow is regulated by the cams of any given channel when allowed to flow through the passages and ports of that channel.

20. The fluid pressure control system of claim 19 wherein:

the system includes at least two of said channels with the number of said cams in each channel being limited to one cam, all of the cams in all of the channels being rigidly mounted on the same shaft, the number of sets of said passages in each channel being limited to one and the number of sets of said ports in each channel being limited to one.

21. The fluid pressure control system of claim 19 wherein:

the system includes at least two of said channels with two of said cams and only one set of said ports in each channel, each cam in the system being mounted to be independently rotated and to be moved vertically;

said cams being mounted on separate shafts, each channel having at least two groups of passages through one of said programming nozzle rings, the cams in each said channel limiting fluid flow through only one set of the passages at any given time and only this same set of passages through which fluid is flowing being aligned with the set of ports, and the programming nozzle ring being movable vertically so as to bring different sets of the passages into alignment with the same set of ports and set of cams.

22. The fluid pressure control system of claim 18 wherein:

said annular means includes at least one nozzle ring and at least one programming ring, with said programming ring mounted concentric with said nozzle ring, all of said passages of the annular means being contained within said nozzle ring, and the size, shape and positions of each of the programming rings being adjusted so that each of the passages through the nozzle ring can be opened and closed by moving the programming ring vertically or rotating the programming ring with respect to the nozzle ring.

23. The fluid pressure control system of claim 22 wherein:

the system includes at least two channels, with each channel including at least two cams, at least one programming ring and one set of ports, and with all cams and programming rings in the system movable independently from each other.

24. A valve comprising:

a plenum chamber having a cylindrical interior surface and at least one port through said surface through which pressurized fluid may flow out of the valve;

an annular shaped programming ring, said ring having at least one opening between its inside and outside surfaces, the outside surface of said ring being cylindrical with approximately the same diameter as said cylindrical interior surface of said plenum chamber and said ring being positioned inside the interior cylindrical surface of said plenum chamber so that substantially all of the pressurized fluid leaviang said plenum chamber through any given port must first flow through at least one opening in said ring;

at least one cam positioned inside said programming ring near said openings to substantially restrict the flow of pressurized fluid from the plenum chamber through at least one of said openings;

said plenum chamber being rotatable with respect to said cam and programming ring so that as each port in the plenum chamber rotates about the cam, the flow of pressurized fluid through the port will be modulated as it is restricted by different parts of the cam and the fluid flow through each port will be turned on and off as the port rotates past the opening in the programming ring.

25. The valve of claim 24 wherein:

the valve includes a plurality of cams and a plurality of ports in the plenum chamber;

each cam and said programming ring can be rotated and moved axially, relative to the axis about which the plenum chamber rotates, so that the waveforms of fluid pressure at the rotating ports may be adjusted;

any of the openings in the programming ring which have a cross-sectional area substantially larger than the cross-sectional area of the smallest port are divided by programming ring supports into subopenings;

the shape of the inside surface of each programming ring and the size, shape and position of each cam are adjusted so that the amount by which the cam restricts the flow of fluid through the programming ring and any one of the ports will vary gradually as the port rotates about the cam.

* * * * *